US012769121B2

(12) United States Patent
Itsede et al.

(10) Patent No.: US 12,769,121 B2
(45) Date of Patent: Oct. 20, 2026

(54) HUD MIRROR HOLDER AND IMAGE POSITIONAL ACCURACY DESIGN

(71) Applicant: Panasonic Automotive Systems America, LLC., Peachtree City, GA (US)

(72) Inventors: Fidelis Itsede, Acworth, GA (US); John Austin, Fayetteville, GA (US); Duane Lucero, Senioa, GA (US)

( * ) Notice: Subject to any disclaimer, the term of this patent is extended or adjusted under 35 U.S.C. 154(b) by 330 days.

(21) Appl. No.: 18/531,295

(22) Filed: Dec. 6, 2023

(65) Prior Publication Data

US 2024/0176142 A1 May 30, 2024

Related U.S. Application Data

(63) Continuation-in-part of application No. 16/670,452, filed on Oct. 31, 2019, now Pat. No. 11,860,362.

(60) Provisional application No. 62/756,783, filed on Nov. 7, 2018.

(51) Int. Cl.
*G02B 27/01* (2006.01)
*G02B 7/182* (2021.01)

(52) U.S. Cl.
CPC ....... *G02B 27/0149* (2013.01); *G02B 7/1821* (2013.01); *G02B 2027/0154* (2013.01)

(58) Field of Classification Search
CPC ... G02B 27/01–0189; G02B 2027/0105–0198; G02B 7/1821; B60K 35/00–90
See application file for complete search history.

(56) References Cited

U.S. PATENT DOCUMENTS

2019/0302457 A1* 10/2019 Kim ....................... B60K 35/53

* cited by examiner

*Primary Examiner* — Christopher A Lamb, II
(74) *Attorney, Agent, or Firm* — Laurence S. Roach, Esq.

(57) ABSTRACT

A head up display mirror holder arrangement for a motor vehicle includes a picture generation unit producing a light field. A mirror reflects the light field such that the light field is visible to the driver as a virtual image. A mirror holder has two opposite ends and an activation feature. The two opposite ends are aligned along a rotational axis of the mirror. The mirror holder retains the mirror. Each of two bushings is coupled to a respective opposite end of the mirror holder. A calibration switch has minimum proximity to the activation feature of the mirror holder.

20 Claims, 13 Drawing Sheets

HUD MIRROR HOLDER AND IMAGE POSITIONAL ACCURACY DESIGN

CROSS-REFERENCED TO RELATED APPLICATIONS

This application is a continuation-in-part that claims benefit of U.S. application Ser. No. 16/670,452 filed on Oct. 31, 2019, now under allowance, which claims the benefit of U.S. Provisional Application No. 62/756,783 filed on Nov. 7, 2018, the disclosures of which are hereby incorporated by reference in their entireties for all purposes.

FIELD OF THE INVENTION

The disclosure relates to a head up display (HUD) system in a motor vehicle.

BACKGROUND OF THE INVENTION

A head up display emits light that reflects off of one or more mirrors and from the front windshield to be seen by the driver. The light appears to come from a virtual image in front of the driver and in front of the windshield. This type of head up display is currently commercially available.

Conventional head up displays create the virtual image by first using a display to create an image. Next, the light from the image is reflected from one or more mirrors. Next, the light from the mirrors is reflected from the windshield. The mirrors are designed and positioned relative to the display so that the light seen by the driver, which is reflected from the windshield, appears to come from a virtual image that is outside of the vehicle. The mirrors and display are typically contained in a package that occupies a volume beneath the top surface of the dashboard.

An arm or a lever may be connected between the mirror holder and a limit switch. This results in the activation face being removed of offset from the rotational axis of the mirror, and increases the proximity of the activation face to the limit switch. This also results in increased tolerance stack-up, which in turn diminishes image accuracy. This known method also complicates the manufacturability of the mirror holder.

SUMMARY

The present invention may provide a mirror holder which accurately tunes the rotation of the mirror with high precision for optical systems such as Heads-Up-Displays (HUD). In order to accurately tune the rotation of the mirror, actuation and pivot features are provided in a self-centering shaft. The self-centering shaft may be located through the rotational axis of the mirror, and may be located precisely with absolute minimum distance to the mirror position calibration switch.

In one embodiment, the invention comprises a head up display mirror holder arrangement for a motor vehicle, including a picture generation unit producing a light field. A mirror reflects the light field such that the light field is visible to the driver as a virtual image. A mirror holder has two opposite ends and an activation feature. The two opposite ends are aligned along a rotational axis of the mirror. The mirror holder retains the mirror. Each of two bushings is coupled to a respective opposite end of the mirror holder. A calibration switch has minimum proximity to the activation feature of the mirror holder.

In another embodiment, the invention comprises a head up display mirror holding method for a motor vehicle, including producing a light field. The light field is reflected such that the light field is visible to the driver as a virtual image. The mirror is retained by use of a mirror holder having two opposite ends. The two opposite ends are aligned along a rotational axis of the mirror. A switch is activated when the mirror holder is at a predetermined position. In response to the activation of the switch, a feedback signal is transmitted to calibrate and record the predetermined position in a memory device.

In yet another embodiment, the invention comprises a head up display mirror holder arrangement for a motor vehicle, including a picture generation unit producing a light field. A mirror reflects the light field such that the light field is visible to the driver as a virtual image. A mirror holder has two opposite ends aligned along a rotational axis of the mirror. The mirror holder retains the mirror. Each of a first bushing and a second bushing is coupled to a respective opposite end of the mirror holder. A bracket couples the first bushing to a housing. The bracket includes a mechanical stop limiting rotation of the mirror relative to the bracket.

An advantage of the present invention is that it may improve mirror position accuracy due to the elimination of an extended arm for switch actuation. The invention may make it possible to locate the image of the HUD with an accuracy that exceeds standard specifications. The activation interface of limiting switches may be brought in very close proximity to the activating face of the mirror, and to the rotational axis of the mirror, which facilitates reduced tolerances and increased image positional accuracy.

Another advantage of the present invention is that the cylindrical shape of the mirror holder (which houses the activation face features) is easy to manufacture. No secondary parts need to be attached to the holder. Also, the tolerances of the shaft are easy to maintain in the tool. Thus, the invention may provide better manufacturability as all the activation features are encompassed in the cylindrical face of the mirror holder. No special slides and lifters are needed in the tool to implement an arm or lever.

Yet another advantage of the invention is that, due to the robustness of the cylindrical shape of the mirror holder's activation feature, there is no breaking-off, or brittle risk as seen on conventional extended activation arm/lever designs. Thus, the invention may provide a reduced scrap rate of the mirror holder due to the elimination of the extended arm/lever. Arm/lever designs are susceptible to breaking off during handling and/or assembly.

A further advantage of the invention is that the conical self-centering feature coupled with a compression spring and the use of high lubricity polymer (POM) increases durability without the need of adding secondary lubricants or grease into the gearing system. This also simplifies the system's tolerance stack-up.

BRIEF DESCRIPTION OF THE DRAWINGS

A better understanding of the present invention will be had upon reference to the following description in conjunction with the accompanying drawings.

DETAILED DESCRIPTION OF THE PREFERRED EMBODIMENTS

Figure 1:
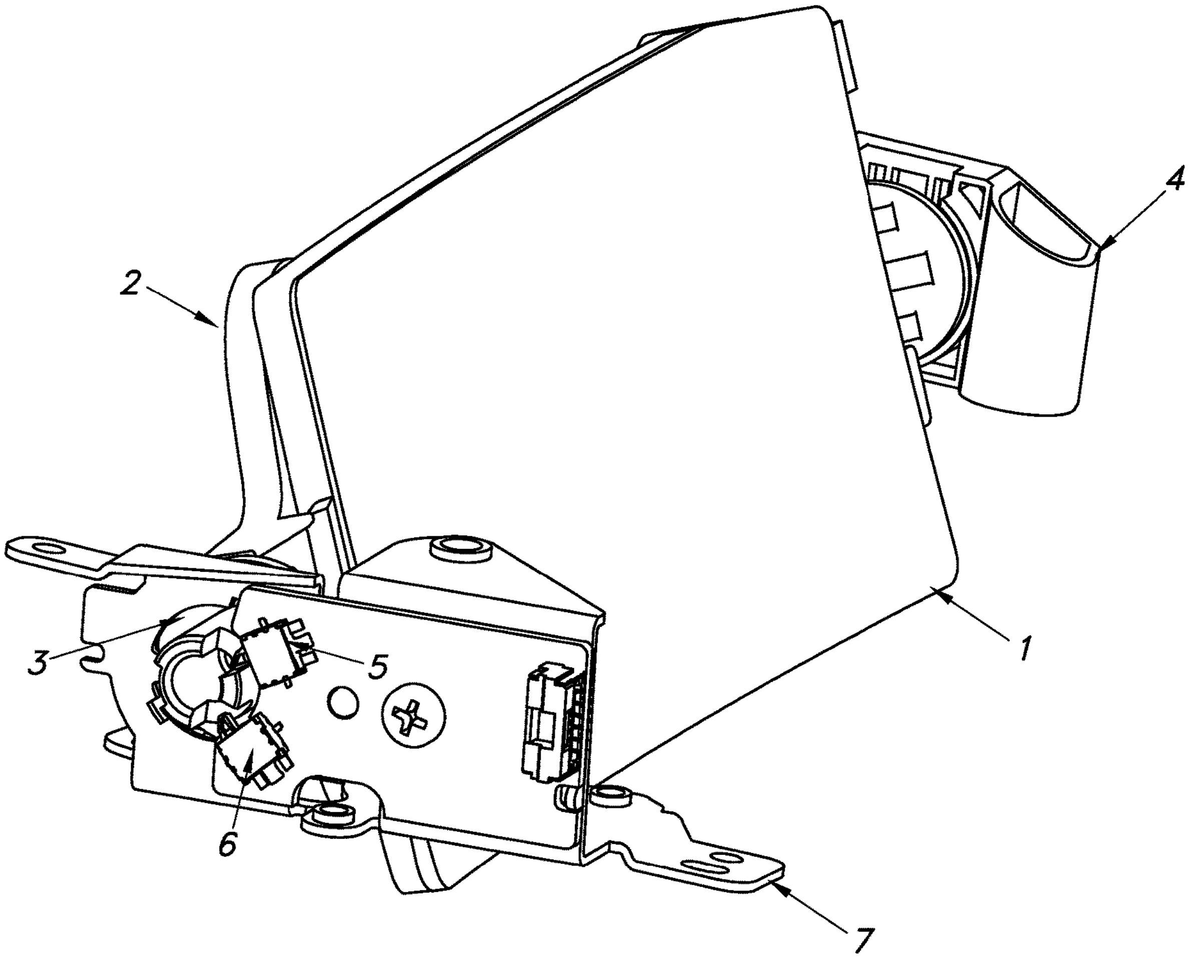
FIG. 1 is a perspective view of one embodiment of a HUD mirror assembly of the present invention.

FIG. 1 illustrates one embodiment of a HUD mirror assembly of the present invention, including a mirror 1 that is mated to a mirror holder 2. Mirror holder 2 is then located, by self-centering features, through a left bushing 3 and a right bushing 4 using the true rotational axis of the mirror's optical plane. Switches 5 and 6 play a very important role in the position of the HUD's image as they are used to calibrate the image position of the HUD, and also serve as feedback for memory storage for mirror 1. Switch 5 is the main calibration switch, and is the part with minimum proximity to the activation feature of mirror holder 2. A bracket 7 is the structure that mounts the HUD mirror assembly rigidly onto the HUD's housing. As mirror 1 and mirror holder 2 rotate, switches 5 and 6 are activated when the required threshold hold or position is achieved. The activated switch then sends a feedback signal to calibrate and record the position of mirror 1 (which is the position of the end image) into memory.

In one embodiment, mirror 1 is made out of injection molded plated COC polyplastic; holder 2 is made from injection molded re-enforced ABS resin; bushings 3 and 4 are made of injection molded POM; switches 5 and 6 are placed on a printed circuit board (PCB) assembly; and bracket 7 is made out of stamped steel. Bushings 3 and 4 are made out of POM which is a material of high lubricity, and which facilitates a smooth and frictional contact at the interface of the parts during rotation.

Figure 2:
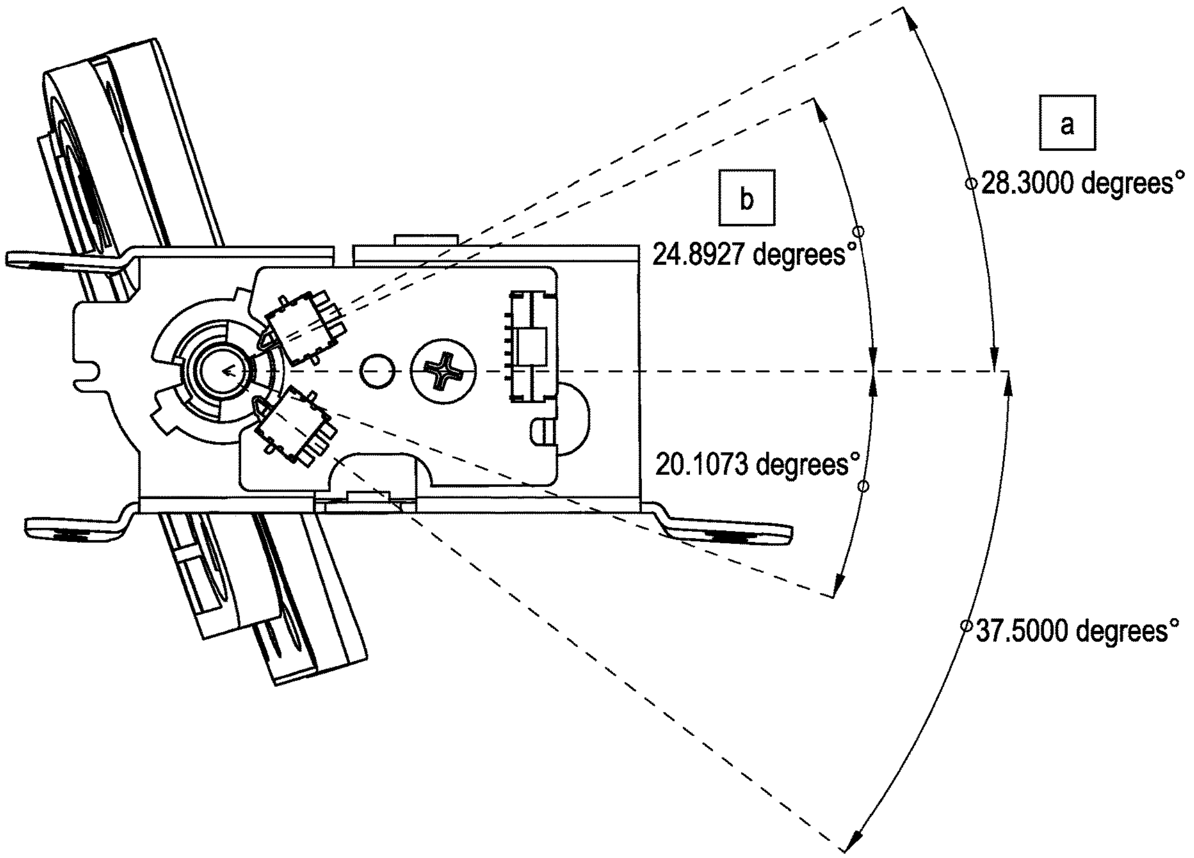
FIG. 2 is a side view of the HUD mirror assembly of FIG. 1.

FIG. 2 is a side view showing the activation angles determined by the actuation surface of holder 2, and switches 5 and 6. These angles are measured from the rotational axis' horizontal plane. FIG. 2 shows the application and interface of all the parts with respect to position accuracy, and also feedback to the HUD for calibration, image location precision and mirror driver circuit protection. From the rotational axis of the mirror, holder 2 has a rotational angle a of 28.3°, and switch 5 (i.e., the main calibration switch) has an angle b of 24.8927°. This yields an activation angle of a−b=3.407°. The angle corresponding to angle a for switch 6 is 37.5°.

Figure 3:
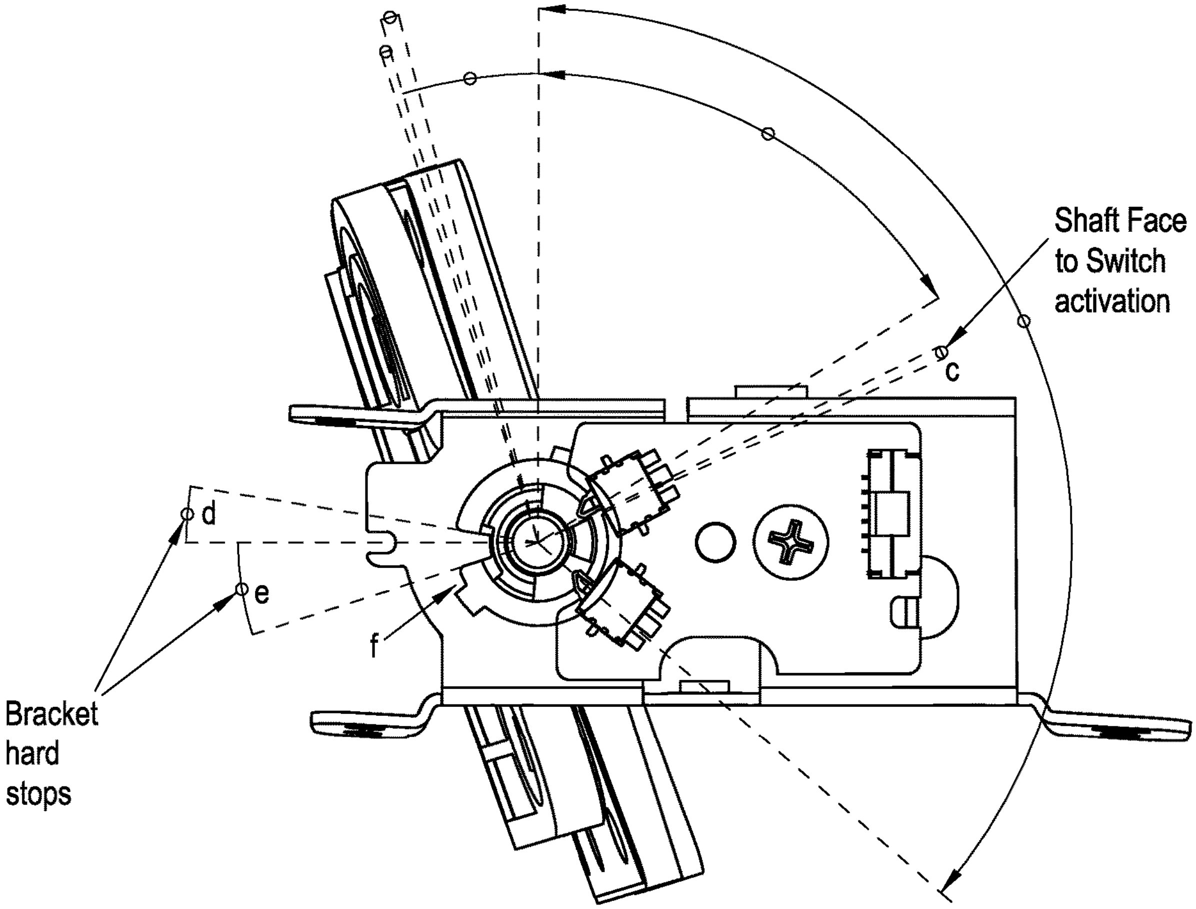
FIG. 3 is another side view of the HUD mirror assembly of FIG. 1.

FIG. 3 is a side view showing the travel distance proximity of the activation face of mirror holder 2 to the activation face of switch 5. FIG. 3 shows the translational distance between the activation face of mirror holder 2 and the activation face of calibration switch 5. This distance (0.5568 mm in one embodiment) from the shaft face to switch activation illustrates the high precision that can be achieved in the activation of the switch as mirror holder 2 is about half a millimeter away from the activation face of switch 5. Thus, tolerance build up is reduced, and precise image location is achieved.

Holder 2 is located with precise angles d and e (8.8 degrees and 17.5 degrees, respectively) to the tab feature f of bracket 7 to provide bracket hard stops. This combination mechanically stops the rotation of mirror 1 in a scenario where a malfunction lets mirror 1 travel outside the design intent window. Implementing this protects the gearing system of the mirror from wearing out or binding. This mechanical stop also protects the motor from burning up due to the malfunction.

Figure 4A:
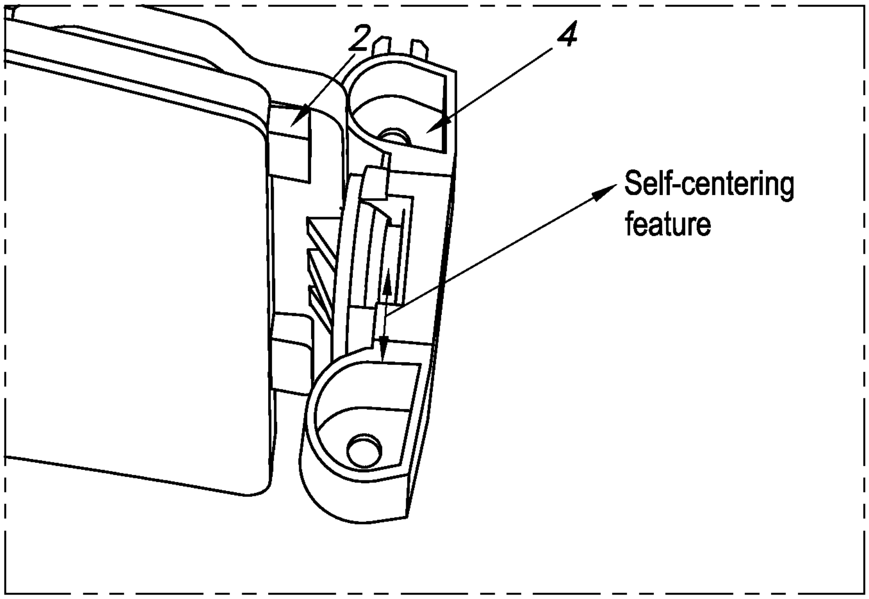
FIG. 4A is a top view of the self-centering feature of the mirror holder of the HUD mirror assembly of FIG. 1.

FIG. 4A illustrates the self-centering feature of mirror holder 2 to bushing 4 in the form of a self-centering bushing on the other end of the mirror holder assembly. The bushing is on the righthand end of the mirror holder assembly.

Figure 4B:
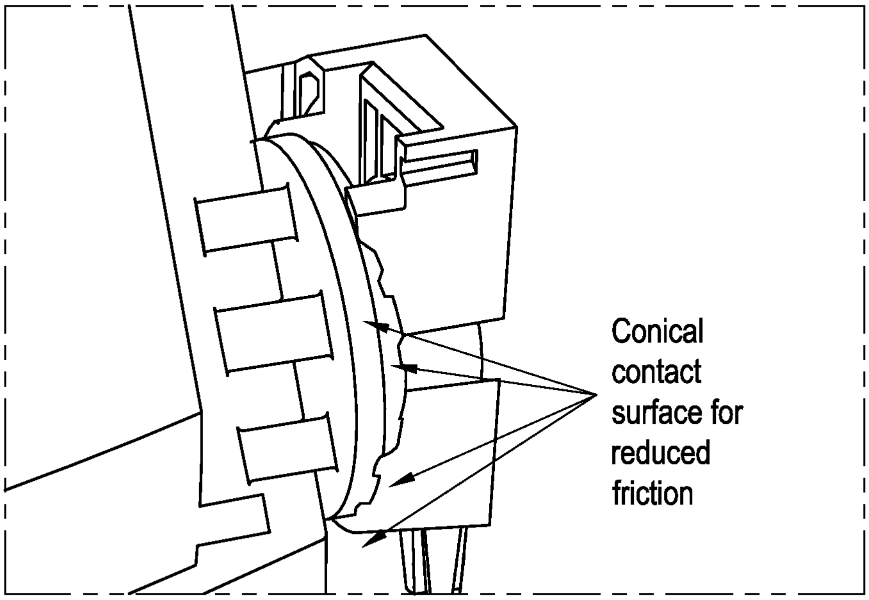
FIG. 4B is a cross-sectional view of the self-centering feature of the right bushing of the HUD mirror assembly of FIG. 1.

The cross-sectional view of the self-centering feature of the bushing is illustrated in FIG. 4B. The conical surfaces may reduce friction between the bushing and the mirror holder's shaft on this end of the holder. This self-centering feature of the bushing at this end of the mirror assembly contributes to the ability to control the 0.554 mm distance on the other end of the mirror assembly. FIG. 4B illustrates the conical contact surface for reduced friction between mirror holder 2 and bushing 4. Instead of a conical contact surface between mirror holder 2 and bushing 4, there may be a frusto-conical contact surface, a semi-spherical contact surface, or a parabolic contact surface, for example.

Figure 5:
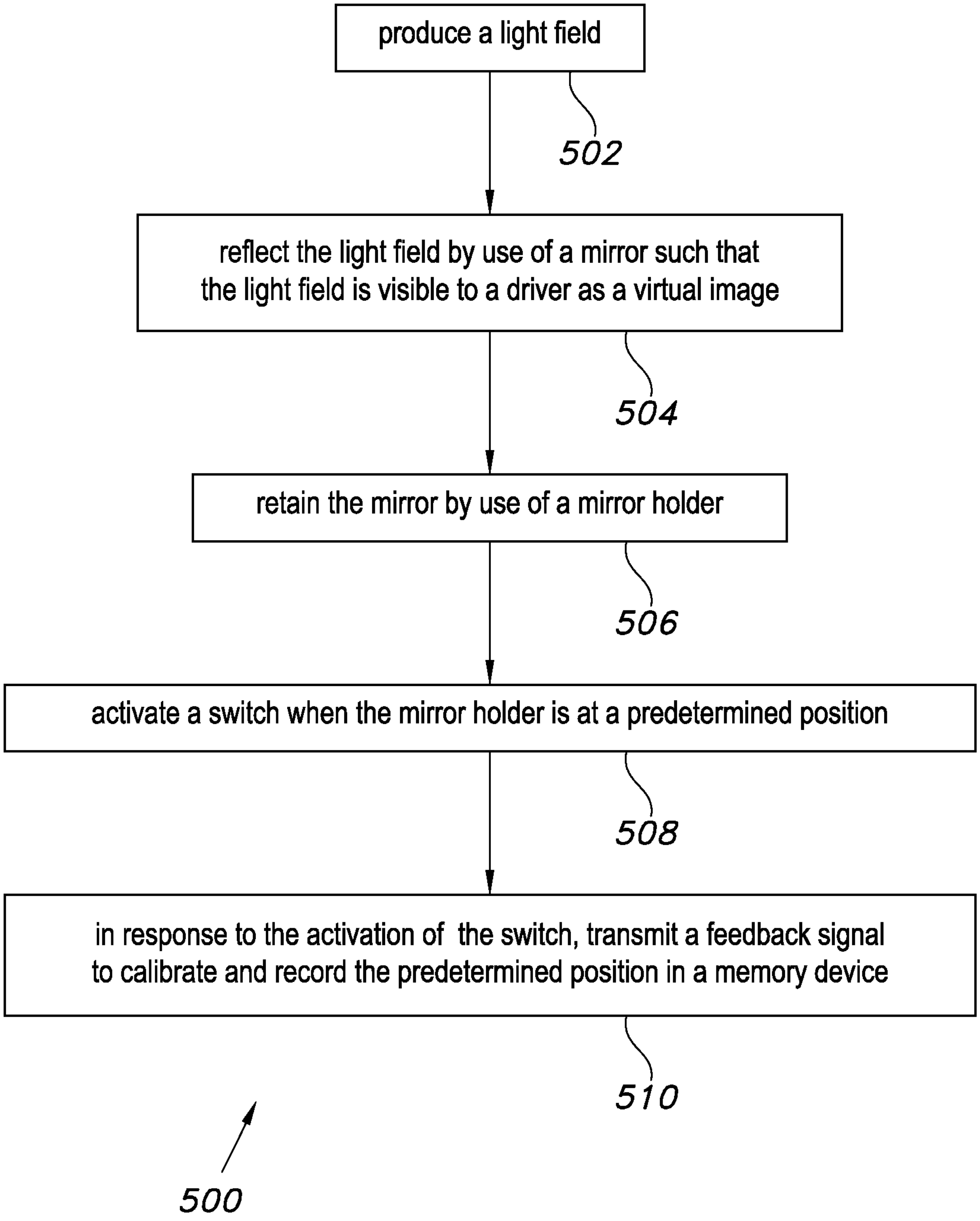
FIG. 5 is a flow chart of one embodiment of a head up display mirror holding method of the present invention for a motor vehicle.

FIG. 5 illustrates one embodiment of a head up display mirror holding method 500 of the present invention for a motor vehicle. In a first step 502, a light field is produced. For example, as described below, LCD 16 (FIG. 6) may produce light 23.

Next, in step 504, the light field is reflected such that the light field is visible to the driver as a virtual image. For example, light 23 from LCD 16 may be reflected by mirrors 20, 22 and windshield 14 toward a user 34. Light 23 may appear to user 34 as a virtual image 36.

In a next step 506, the mirror is retained by use of a mirror holder. For example, mirror 1 may be mated to a mirror holder 2.

In step 508, a switch is activated when the mirror holder is at a predetermined position. For example, as mirror 1 and mirror holder 2 rotate, switches 5 and 6 may be activated when the required threshold hold or position is achieved.

In a final step 510, in response to the activation of the switch, a feedback signal is transmitted to calibrate and record the predetermined position in a memory device. For example, the activated switch 5, 6 may send a feedback signal to calibrate and record the position of mirror 1 (which is the position of the end image) into memory device 18.

Figure 6:
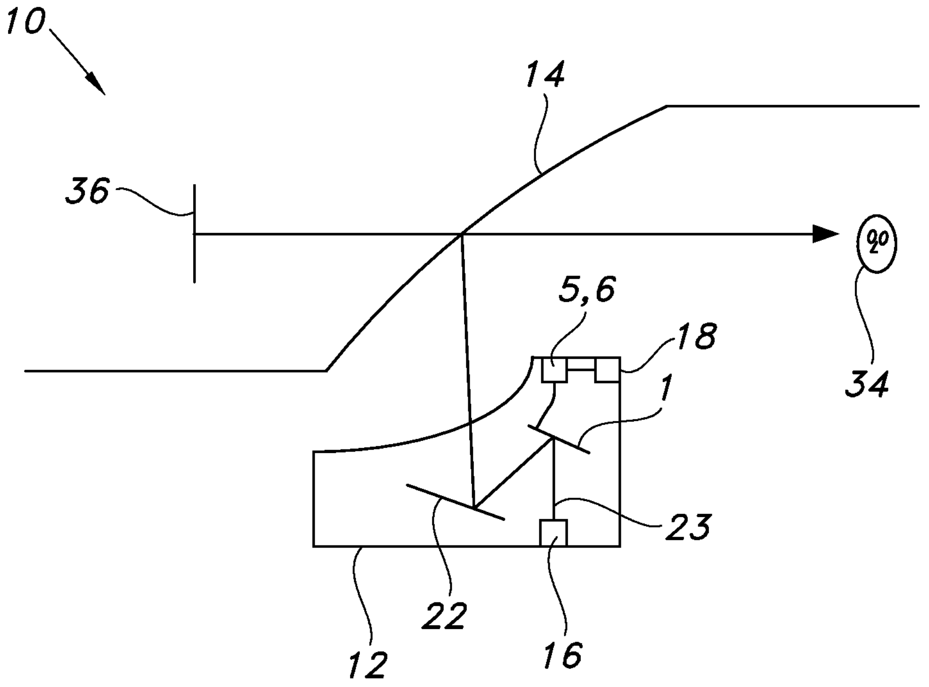
FIG. 6 is a schematic side view of one embodiment of an automotive head up display arrangement of the present invention.

FIG. 6 illustrates one embodiment of an automotive head up display arrangement 10 of the present invention, including a HUD module 12 and a windshield 14. HUD module 12 includes a PGU in the form of LCD 16, a first mirror 1, a second mirror 22, switches 5, 6, and a memory device 18.

A feature of the invention is a controlled distance 38 (FIG. 11) needed to be travelled before the switch engages and stops the mirror from rotating. This controlled distance may improve the accuracy of the position of the HUD's image. In one embodiment, this controlled distance is 0.554 mm. An activation feature 40 of mirror holder 2 may be rotated into engagement with calibration switch 5. This distance is the clearance between the mirror holder shaft activation face 40 of mirror holder 2 (which holds the mirror, the position of which, in turn, defines and determines the position of the HUD image on the windshield) and a switch activation face 42.

The controlled distance of approximately between 0.554 mm and 0.5568 mm in one embodiment may be the maximum distance between activation faces that is allowed without parking of the head up display. Head up displays can be parked when the vehicle ignition is off, analogously to how a printer can be parked when power is off. When parked, the mirror of the HUD may be turned to an inoperable rotational position to avoid reflecting sunlight. Switch 6 may be used to execute parking.

The controlled distance may be controlled by software and hardware. In one embodiment, if the controlled distance exceeds 0.554 mm, an overcurrent condition in the motor that drives the rotational gears of the mirror is sensed, which causes the voltage applied to the motor to be reduced or removed entirely. However, the reduction in voltage to the motor can be overridden by a signal indicating that the HUD is parking. The overcurrent condition when the controlled distance exceeds 0.554 mm may be due to different gearing (e.g., gear teeth, gear radii) required to move the mirror such that the controlled distance exceeds 0.554 mm. The actual rotational position of the mirror may be determined and calibrated when switch 5 is activated by activation feature 40 of mirror holder 2 and the controlled distance is approximately zero. Subsequent rotational positions of the mirror can then be calculated relative to this zero position of the mirror at which the mirror holder actuates switch 5 and the actual rotational position of the mirror is thereby confirmed.

Figure 7:
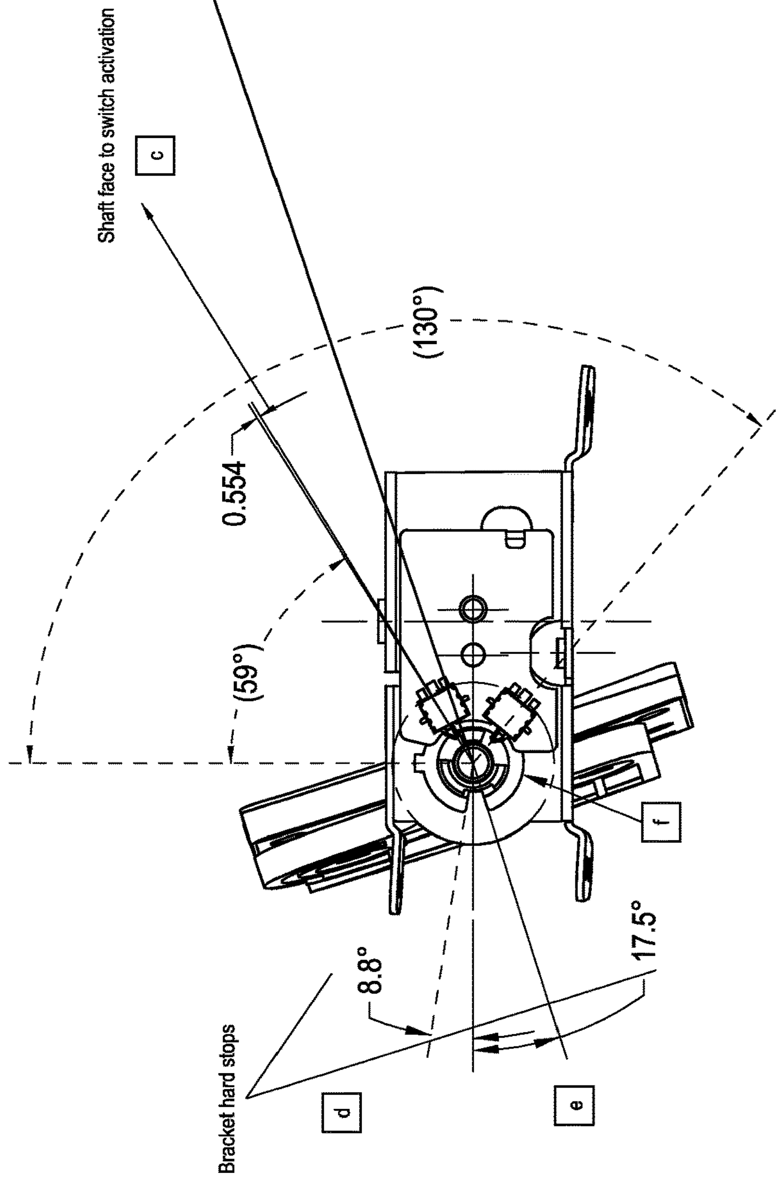
FIG. 7 is yet another side view of the HUD mirror assembly of FIG. 1.
Figure 8:
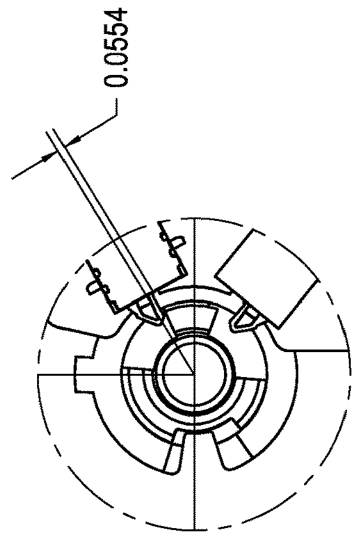
FIG. 8 is an enlarged view of area A of FIG. 7.
Figure 9:
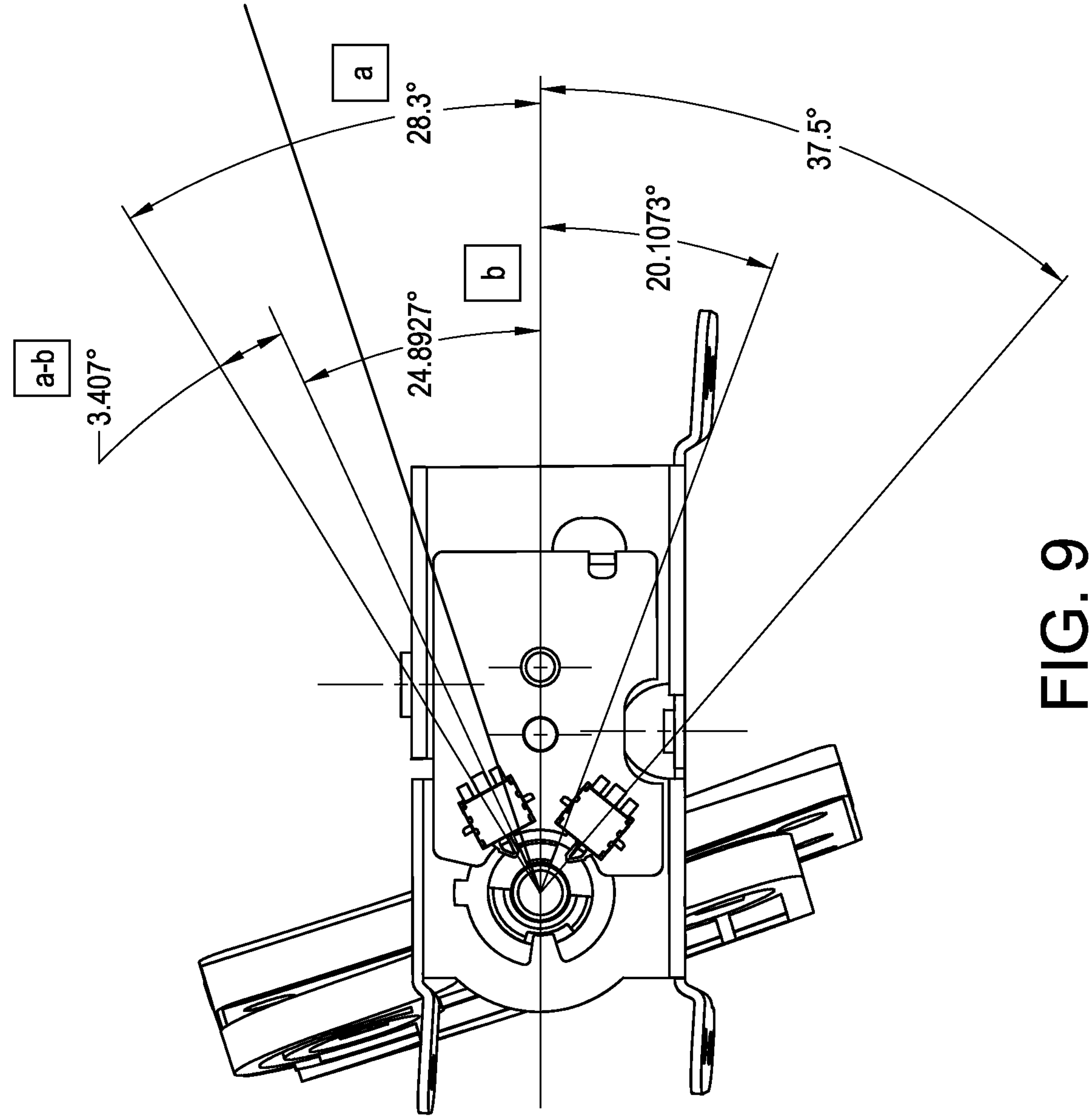
FIG. 9 is still another side view of the HUD mirror assembly of FIG. 1.
Figure 10:
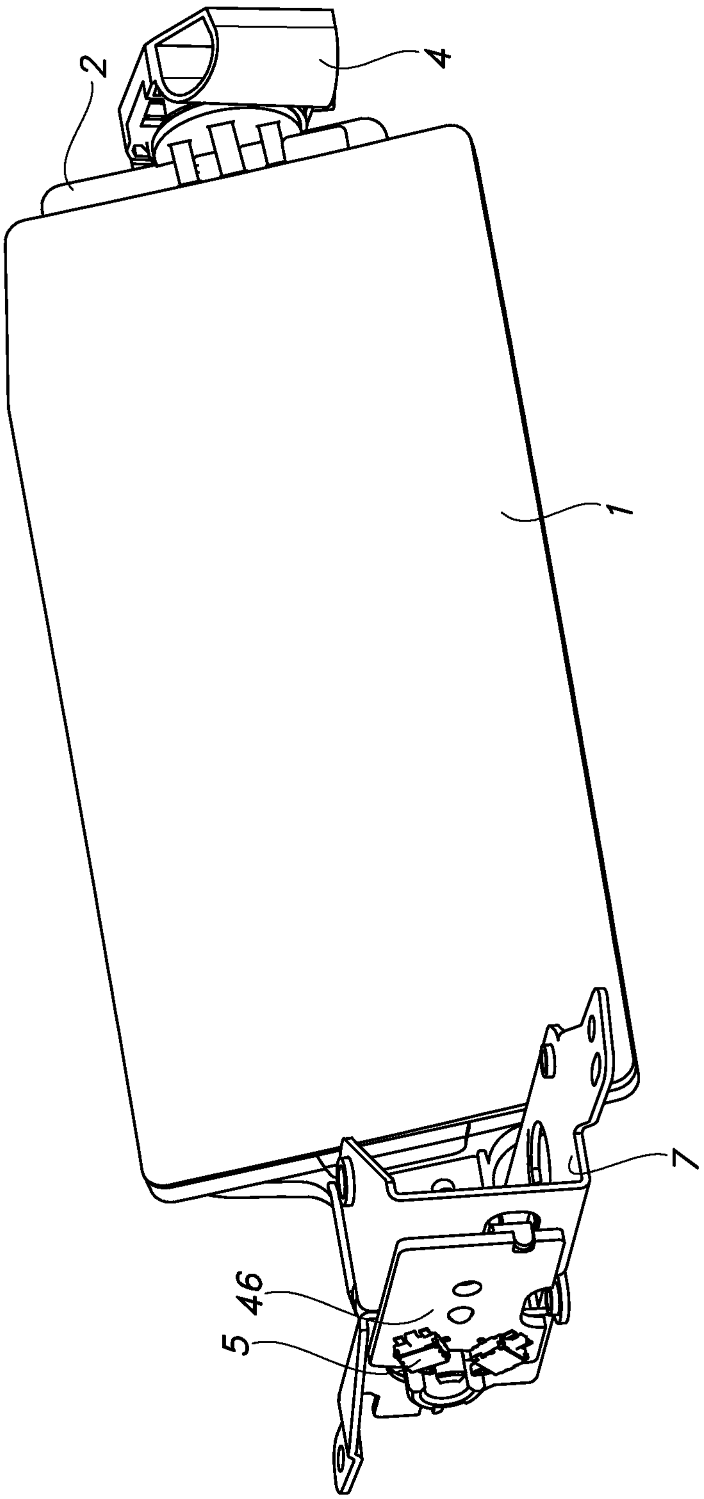
FIG. 10 is another perspective view of the HUD mirror assembly of FIG. 1.
Figure 11:
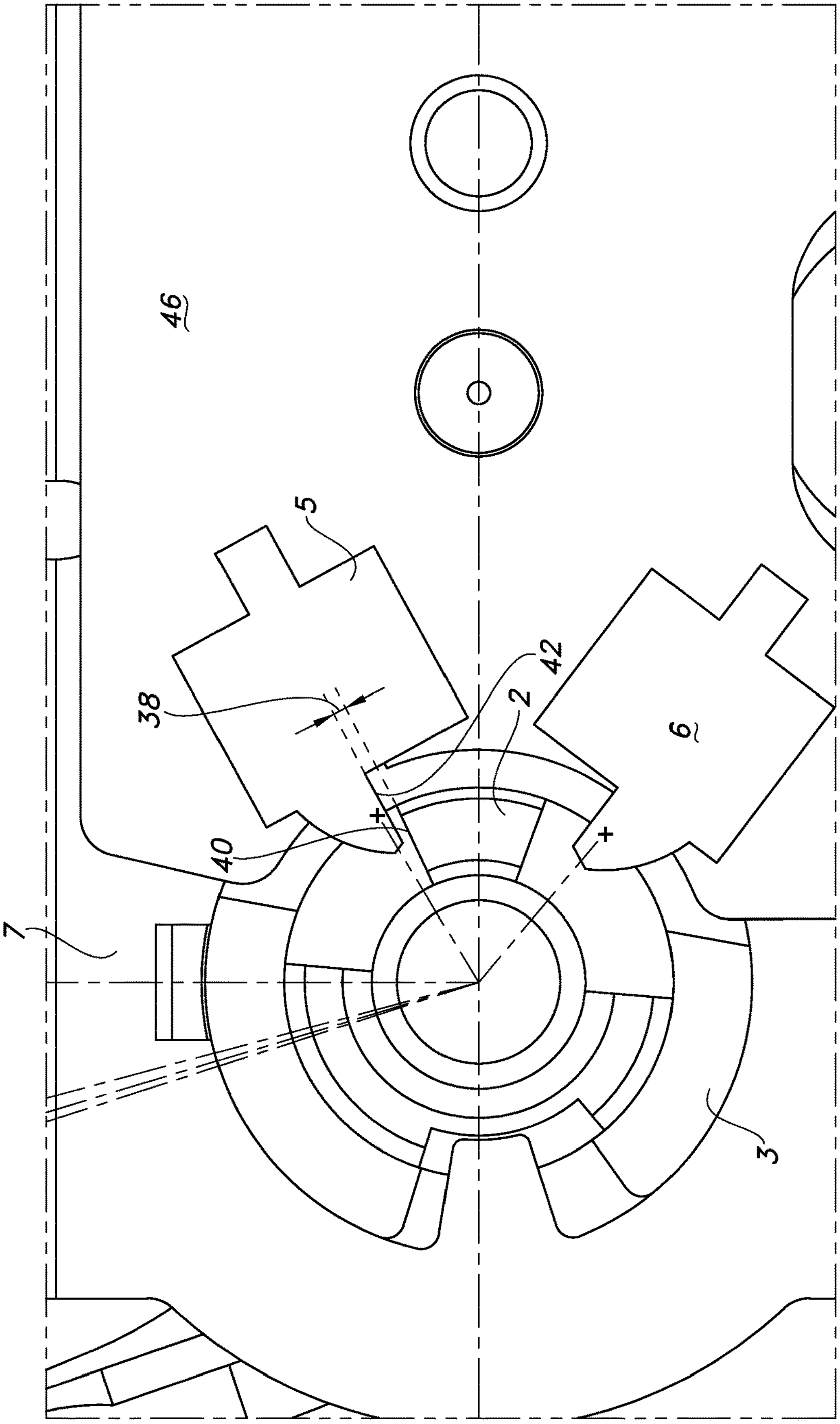
FIG. 11 is an enlarged side view of the HUD mirror assembly of FIG. 1.
Figure 12:
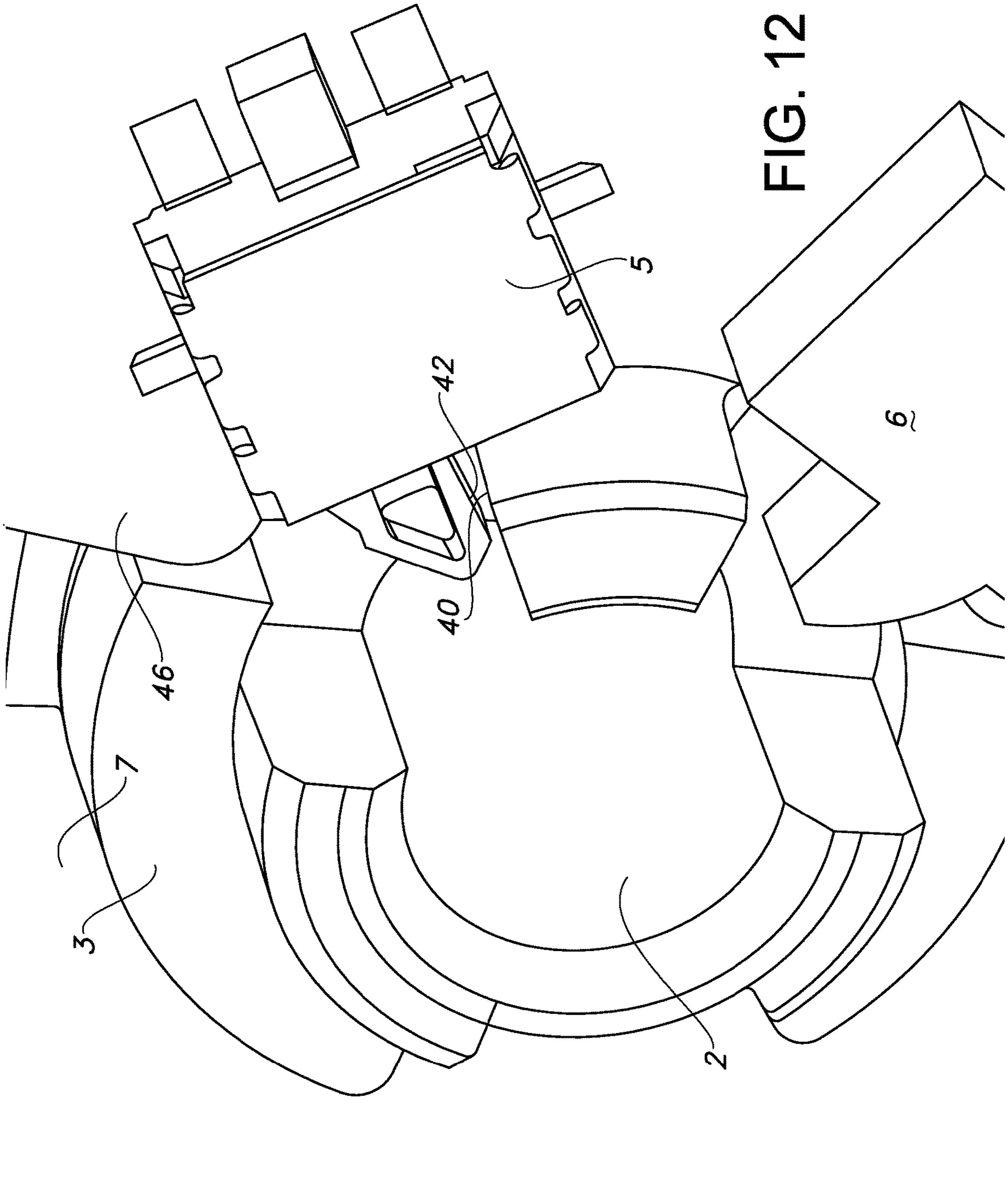
FIG. 12 is an enlarged perspective view of the HUD mirror assembly of FIG. 1.
Figure 13:
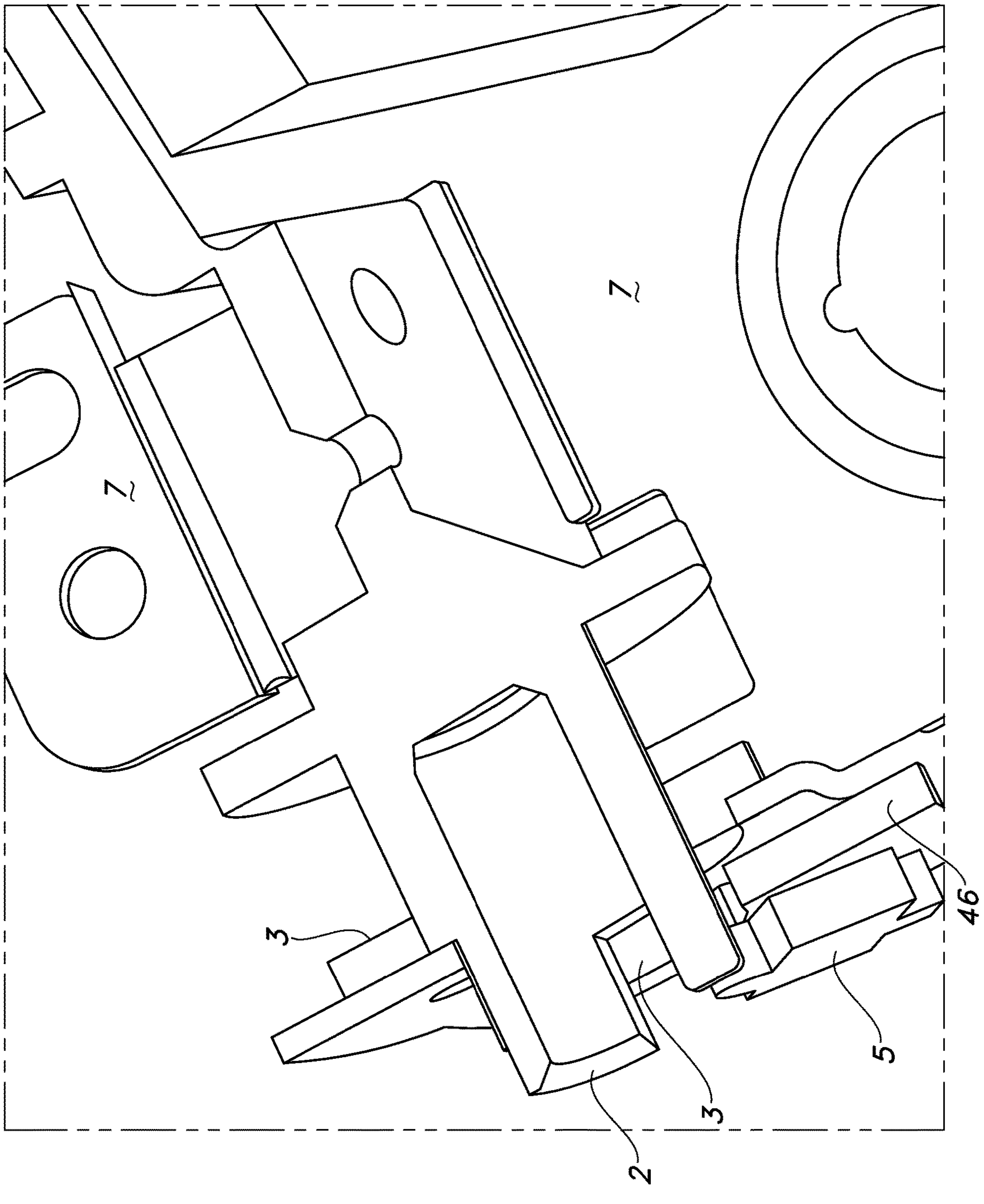
FIG. 13 is a cross-sectional view of the left end of the HUD mirror assembly of FIG. 1.
Figure 14:
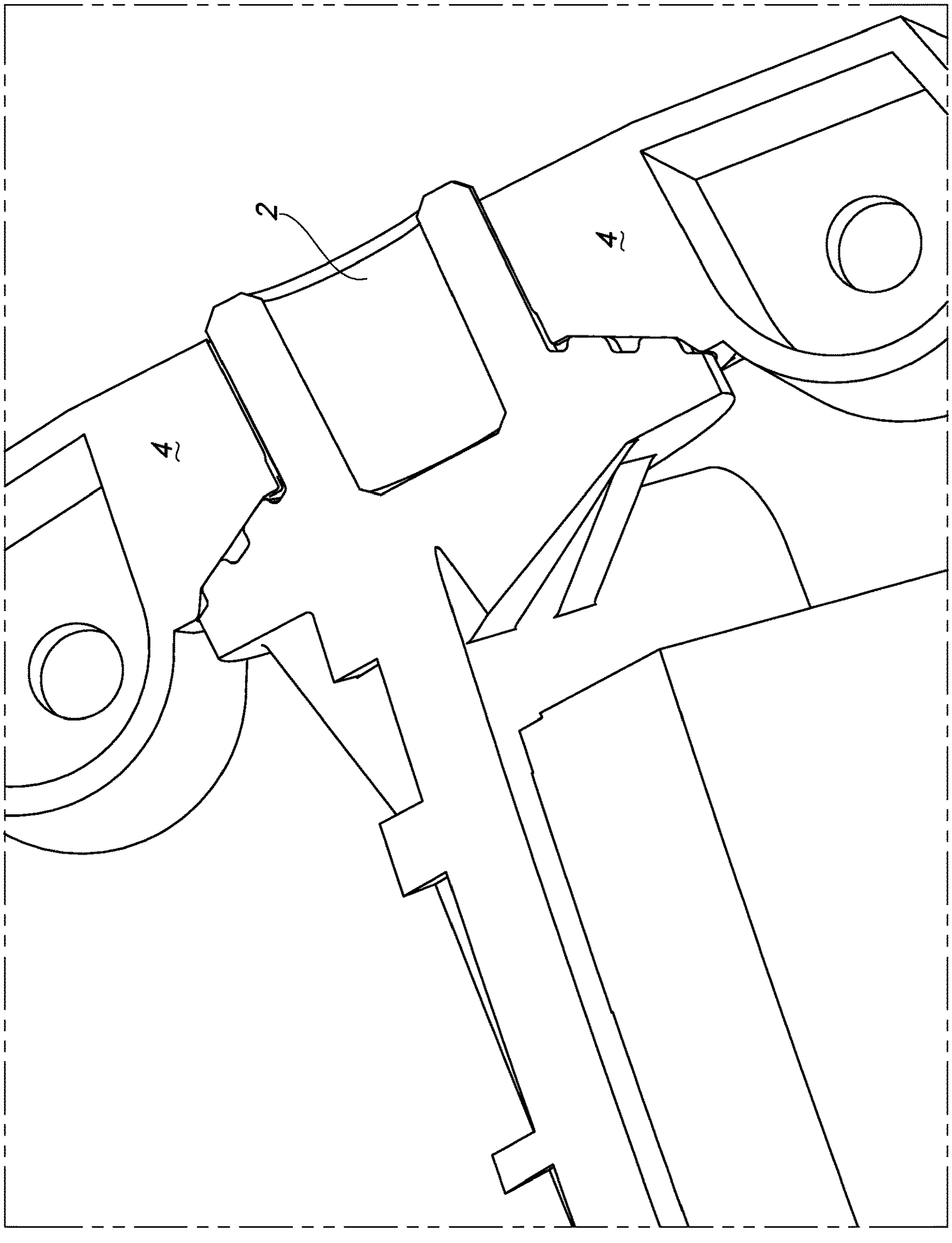
FIG. 14 is a cross-sectional view of the right end of the HUD mirror assembly of FIG. 1.

Also shown in FIG. 11 are kinematics bracket 7, a mirror position-sensing printed circuit board (PCB) 46 on which switch 5 may be mounted, and mirror holder bushing 3. Bracket 7 may hold the switches PCB 46, and provide a rotational/housing structure for the mirror holder 2. The hard-stops of bracket 7, as shown in FIG. 7, help provide and guarantee the controlled 0.554 mm distance.

During use, light 23 from LCD 16 may be reflected by mirrors 1, 22 and windshield 14 toward a user 34. Light 23 may appear to user 34 as a virtual image 36. As mirror 1 rotates, switches 5 and 6 are activated when the required threshold hold or position is achieved. The activated switch 5, 6 then sends a feedback signal to calibrate and record the position of mirror 1 (which is the position of the end image) into memory device 18.

The foregoing description may refer to "motor vehicle", "automobile", "automotive", or similar expressions. It is to be understood that these terms are not intended to limit the invention to any particular type of transportation vehicle. Rather, the invention may be applied to any type of transportation vehicle whether traveling by air, water, or ground, such as airplanes, boats, etc.

The foregoing detailed description is given primarily for clearness of understanding and no unnecessary limitations are to be understood therefrom for modifications can be made by those skilled in the art upon reading this disclosure and may be made without departing from the spirit of the invention.

What is claimed is:

1. A head up display mirror holder arrangement for a head up display of a motor vehicle, the arrangement comprising:
- a picture generation unit configured to produce a light field;
- a mirror configured to reflect the light field such that the light field is visible to the driver as a virtual image;
- a mirror holder having two opposite ends and an activation feature, the two opposite ends being aligned along a rotational axis of the mirror, the mirror holder being configured to retain the mirror;
- two bushings, each said bushing being coupled to a respective said opposite end of the mirror holder; and
- a calibration switch configured to be engaged and activated by the activation feature of the mirror holder when the mirror holder is rotated to a predetermined position, the calibration switch being separated from the activation feature by a nonzero translation distance of less than one millimeter.

2. The head up display mirror holder arrangement of claim 1 wherein the calibration switch has a nonzero minimum proximity to the activation feature of the mirror holder.

3. The head up display mirror holder arrangement of claim 1 further comprising a self-centering feature between the mirror holder and one of the bushings.

4. The head up display mirror holder arrangement of claim 1 wherein the calibration switch and the mirror holder define an activation angle of less than five degrees when the calibration switch is separated from the activation feature by the nonzero translation distance of less than one millimeter and by at least 0.4 millimeter.

5. The head up display mirror holder arrangement of claim 1 wherein each of the mirror holder and one of the bushings has a respective conical contact surface, the conical contact surfaces interfacing with each other.

6. The head up display mirror holder arrangement of claim 1 wherein the activation feature of the mirror holder has a cylindrical shape.

7. The head up display mirror holder arrangement of claim 1 further comprising a bracket configured to couple one of the bushings to a housing, the bracket including a mechanical stop configured to limit rotation of the mirror relative to the bracket.

8. The head up display mirror holder arrangement of claim 1 wherein the calibration switch has a first activation face, and the activation feature of the mirror holder has a second activation face, the first activation face being configured to be engaged by the second activation face, the first activation face and the second activation face being separable by no more than the translation distance of less than one millimeter without parking of the head up display such that the mirror holder is rotated to an inoperable rotational position.

9. A head up display mirror holding method for a motor vehicle, said method comprising:
- producing a light field;
- reflecting the light field by use of a mirror such that the light field is visible to the driver as a virtual image;
- providing a switch having a first activation face;
- retaining the mirror by use of a mirror holder having a second activation face, the second activation face being separable from the first activation face by a nonzero translation distance of less than one millimeter, the second activation face being unable to be separated from the first activation face by more than the nonzero translation distance of less than one millimeter unless the mirror holder is being parked in a rotational position at which the light field is not visible to the driver;

rotating the mirror holder toward the switch from a position where the second activation face is separated from the first activation face by the translation distance;

activating the switch when the mirror holder is at a predetermined position at which the second activation face engages the first activation face; and in response to the activation of the switch, transmitting a feedback signal to calibrate and record the predetermined position in a memory device.

10. The head up display mirror holding method of claim 9 wherein a proximity of the switch to the second activation face of the mirror holder comprises a translation distance of less than 0.6 millimeter.

11. The head up display mirror holding method of claim 9 further comprising:

coupling a bushing to the mirror holder, wherein each of the mirror holder and the bushing has a respective conical contact surface, the conical contact surfaces interfacing with each other; and providing a self-centering feature between the mirror holder and the bushing.

12. The head up display mirror holding method of claim 9 wherein the switch and the mirror holder define an activation angle of less than four degrees.

13. The head up display mirror holding method of claim 9 wherein the mirror holder includes an activation feature having a cylindrical shape.

14. The head up display mirror holding method of claim 9 further comprising:

coupling a bushing to the mirror holder; and coupling the bushings to a housing by use of a bracket, the bracket including a mechanical stop that limits rotation of the mirror relative to the bracket.

15. A head up display mirror holder arrangement for a head up display of a motor vehicle, the arrangement comprising:

a picture generation unit configured to produce a light field;

a mirror configured to reflect the light field such that the light field is visible to the driver as a virtual image;

a mirror holder having two opposite ends and an activation feature, the two opposite ends being aligned along a rotational axis of the mirror, the mirror holder being configured to retain the mirror; and a calibration switch configured to be engaged and activated by the activation feature of the mirror holder when the mirror holder is rotated to a predetermined position, the calibration switch being separated from the activation feature by a nonzero translation distance of less than one millimeter, the calibration switch and the activation feature being separable by no more than the translation distance of less than one millimeter without parking of the head up display such that the mirror holder is rotated to an inoperable rotational position whereat sunlight cannot impinge upon the mirror.

16. The head up display mirror holder arrangement of claim 15 wherein the nonzero translation distance is less than 0.6 millimeter.

17. The head up display mirror holder arrangement of claim 15 wherein the calibration switch and the mirror holder define an activation angle of less than five degrees.

18. The head up display mirror holder arrangement of claim 15 wherein the mirror holder has a conical contact surface.

19. The head up display mirror holder arrangement of claim 15 wherein the activation feature of the mirror holder has a cylindrical shape.

20. The head up display mirror holder arrangement of claim 15 further comprising a bracket including a mechanical stop configured to limit rotation of the mirror relative to the bracket.

* * * * *